(12) United States Patent
Furlong et al.

(10) Patent No.: US 11,747,116 B2
(45) Date of Patent: Sep. 5, 2023

(54) COUNTER UAV DRONE SYSTEM USING ELECTROMAGNETIC PULSE

(71) Applicant: The United States of America, as represented by the Secretary of the Navy, Crane, IN (US)

(72) Inventors: Steven Craig Furlong, Bloomington, IN (US); Timothy Michael Lang, Bloomington, IN (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/752,114

(22) Filed: May 24, 2022

(65) Prior Publication Data

US 2022/0290948 A1     Sep. 15, 2022

Related U.S. Application Data

(62) Division of application No. 16/875,149, filed on May 15, 2020, now Pat. No. 11,378,362.

(51) Int. Cl.
| | | |
|---|---|---|
| *F41H 13/00* | (2006.01) | |
| *F41H 11/02* | (2006.01) | |
| *G05D 1/00* | (2006.01) | |
| *B64C 39/02* | (2023.01) | |
| *B64U 101/15* | (2023.01) | |

(52) U.S. Cl.
CPC ....... *F41H 13/0093* (2013.01); *B64C 39/024* (2013.01); *F41H 11/02* (2013.01); *G05D 1/0016* (2013.01); *B64U 2101/15* (2023.01); *B64U 2201/20* (2023.01)

(58) Field of Classification Search
CPC ... F41H 13/0093; F41H 11/02; B64C 39/024; G05D 1/0016; B64U 2201/20; B64U 2201/15
USPC .......................................................... 89/1.11
See application file for complete search history.

(56) References Cited

U.S. PATENT DOCUMENTS

| | | | |
|---|---|---|---|
| 2014/0231679 A1* | 8/2014 | Kremeyer | G21K 1/08 378/145 |
| 2018/0038675 A1* | 2/2018 | Graswald | F41H 13/0093 |
| 2020/0363167 A1* | 11/2020 | Furlong | B64C 39/024 |
| 2022/0290948 A1* | 9/2022 | Furlong | B64C 39/024 |

FOREIGN PATENT DOCUMENTS

WO    WO-2021174291 A1 *   9/2021    .......... B64C 39/024

* cited by examiner

*Primary Examiner* — Samir Abdosh
(74) *Attorney, Agent, or Firm* — Naval Surface Warfare Center, Crane Division (57) ABSTRACT

In general, the present invention is directed to airborne security measures and more specifically to a device and method to defeat in total a plurality of approaching Unmanned Aerial Vehicles (UAVs) with a single sacrificial intercepting drone. In a preferred embodiment of the invention the intercepting drone may be configured with an attached Electro-Magnetic Pulse (EMP) generation device capable of producing a sufficiently intense EMP burst to completely disable all approaching UAVs.

7 Claims, 8 Drawing Sheets

FIG. 3E
"EMP DRAFTING"

COUNTER UAV DRONE SYSTEM USING ELECTROMAGNETIC PULSE

CROSS REFERENCE TO RELATED APPLICATIONS

This application is a divisional of U.S. patent application Ser. No. 16/875,149, filed on May 15, 2020, entitled "COUNTER UAV DRONE SYSTEM USING ELECTROMAGNETIC PULSE," which claims priority to U.S. Provisional Patent Application Ser. No. 62/849,312, filed May 17, 2019 entitled "COUNTER UAV EMP SYSTEM AND METHODS," the disclosure of which is expressly incorporated herein by reference.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200584US03) is assigned to the United States Government and is available for licensing for commercial purposes. Licensing and technical inquiries may be directed to the Technology Transfer Office, Naval Surface Warfare Center, Crane Division, email: Cran_CTO@navy.mil.

FIELD OF THE INVENTION

The present invention relates to an Unmanned Aerial Vehicle (UAV) with an attached Electro-Magnetic Pulse (EMP) generation device capable of disabling all approaching UAVs.

BACKGROUND

Today, UAVs are ubiquitous in the commercial market place. They can be equipped with a wide variety of tools and features to enable a diverse set of functionality. As drone technology becomes more sophisticated and the costs of such drones decreases, the use of drones will continue to increase. Troublemakers can attempt to disrupt events or places of business by operating a large number of drones which can bypass or overwhelm security measures.

Attempts have been made to counter UAVs. U.S. Pat. No. 9,896,221 proposes a device and method to defeat approaching drones by a capturing UAV with a deployable net attached to the fuselage of the UAV. The net may be deployed from (and remain attached to) the UAV fuselage via a mechanical structure with the goal of "ensnarling" the approaching UAV in the net. A similar approach to the 221' patent, a net attached to the capturing UAV, can be found in U.S. Patent Application 2016/0023760466466.

Although there exist solutions for dealing with single UAVs or multiple close UAVs, there still exists a need for a device and method to disable/destroy a plurality of UAVs disbursed over a wide expanse (e.g., across an airport). The present invention addresses this need.

SUMMARY OF THE INVENTION

In general, the present invention is directed to airborne security measures and more specifically to a device and method to defeat in total a plurality of approaching Unmanned Aerial Vehicles (UAVs) with a single sacrificial intercepting drone. The invention discloses attaching an Electro Magnetic Pulse (EMP) generating device to a sacrificial interceptor UAV and via remote pilot wireless control, flying the said interceptor UAV into the centroid of the attacking "swarm" and activating the EMP generating device with the goal of disabling or possibly destroying the onboard electronics in the approaching UAVs by way of the following effect.

Electronic devices, especially computer based devices, are particularly vulnerable to EMP effects, as they are largely composed of high density Metal Oxide Semiconductor (MOS) devices, which are very sensitive to exposure to high voltage transients. What is significant about MOS devices is that very little energy is required to permanently wound or destroy them, any voltage typically in excess of 10 Volts can produce an effect termed gate breakdown which effectively destroys the device. Even if the pulse itself is not powerful enough to produce total destructive damage, the power supply in the equipment will readily supply enough energy to complete the destructive process. Wounded devices may still function, but their reliability will be seriously impaired. Shielding electronics by equipment chassis provides only limited protection, as any cables running in and out of the equipment will function as an antenna, in effect guiding the high voltage transients into the equipment.

Other electronic devices and electrical equipment may also be destroyed by the EMP effect. Telecommunications equipment can be highly vulnerable, due to the presence of copper leads/cables between devices. Receivers of all varieties are particularly sensitive to EMP, as the highly sensitive miniature high frequency transistors and diodes in such equipment are easily destroyed by exposure to high voltage electrical transients. Therefore, radar and electronic equipment, satellite, microwave, UHF, VHF, HF and low band communications equipment and video equipment are all potentially vulnerable to the EMP effect. Given this, the activation of the interceptor UAV EMP generating device may also interrupt, or completely destroy, any wireless communication from a remote pilot commanding the incoming swarm.

A preferred embodiment of the present invention describes an interceptor UAV for simultaneously disabling a plurality of incoming UAVs comprising a generally cylindrical fuselage, a propulsion system, the said propulsion system including a means to power at least one propeller, at least one control surface, a guidance system in mechanical communication with the at least one control surface, the said guidance system in wireless communication and responsive to wireless commands received from a remote pilot, an electro-magnetic pulse generating device attached to the generally cylindrical fuselage, and a means to activate the said electro-magnetic pulse generating device.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

In general, the present invention is directed to airborne security measures and more specifically to a device and method to defeat in total a plurality of approaching Unmanned Aerial Vehicles (UAVs) with a single sacrificial intercepting drone. In a preferred embodiment of the invention the intercepting drone may be configured with an attached Electro-Magnetic Pulse (EMP) generating device capable of producing a sufficiently intense EMP burst to completely disable all approaching UAVs.

Figure 1:
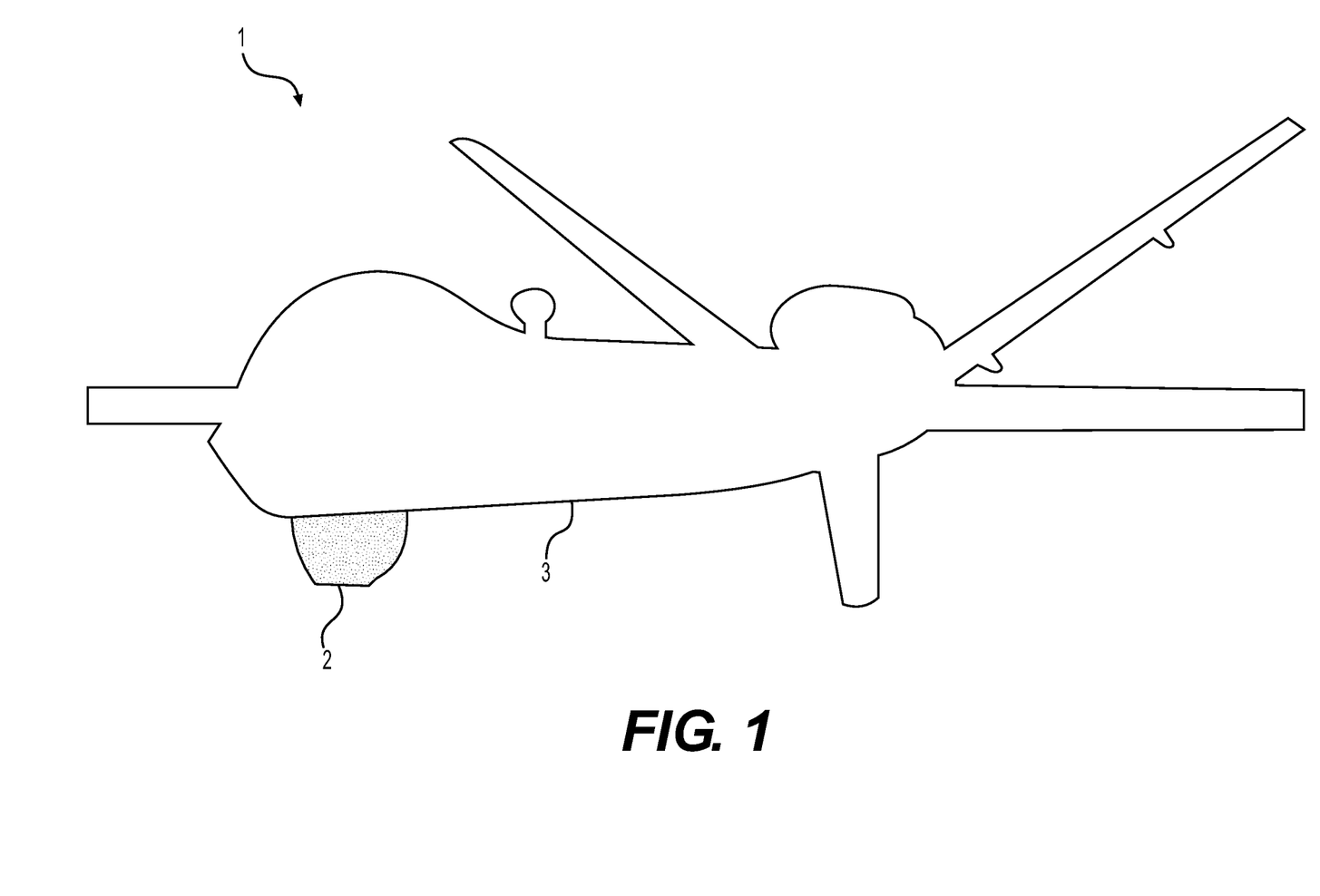
FIG. 1 shows a schematic representation of one embodiment of the present invention depicting an unmanned aerial vehicle (UAV) with an attached electromagnetic pulse generating device attached to the UAV fuselage.

One embodiment of the present invention is shown in FIG. 1 depicting an unmanned aerial vehicle (UAV) 1 with an Electro-Magnetic Pulse (EMP) generating device 2 attached to the UAV's fuselage region 3. The UAV may be configured with the necessary hardware (not shown) to receive wireless communication commands from a remote pilot to both navigate the UAV and detonate the EMP device.

Figure 2:
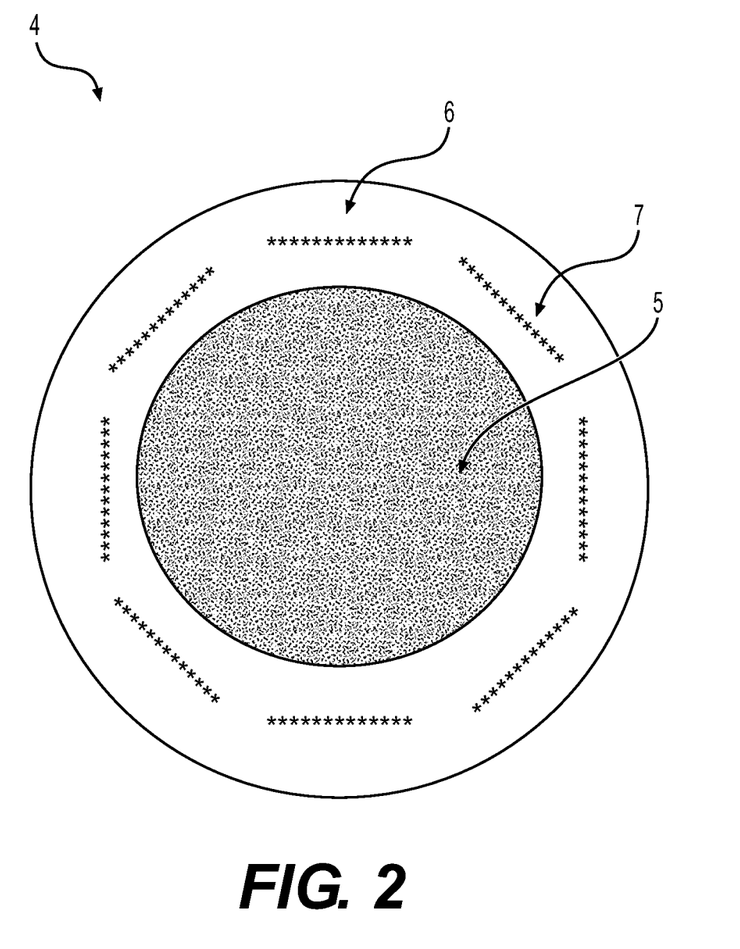
FIG. 2 shows a cross sectional representation of one embodiment of the present invention depicting the electromagnetic pulse generating device shown in FIG. 1.

FIG. 2 shows a cross sectional view of one embodiment of the Electro-Magnetic Pulse (EMP) generating device depicted in FIG. 1. The EMP generating device 4 may be comprised of a centrally located explosive material 5, surface wrapped with a host material 6. The host material 6 may encase charged particles 7 from the family of alkali metals including lithium ions, cesium ions, potassium ions or a combination thereof. One example in the prior art, U.S. Pat. No. 10,088,278 teaches utilizing intercalated graphite as the host material 6 to encase the charged particle 7 ions, and the 278' patent is incorporated herein by reference in its entirety. The centrally located highly explosive material 5 may have an integrated detonator device 8, which may be configured to receive a wireless command from the remote UAV pilot to initiate detonation of the highly explosive material.

Upon detonation, the encased ions 7 may be liberated from their host material 6, and under extreme acceleration may generate an intense Electro-Magnetic Pulse (EMP). Given the spherical geometry of the EMP generating device 4, the radiated EMP pulse may propagate radially outward, and may disable or destroy all incoming UAV's within a certain distance.

Figure 3:
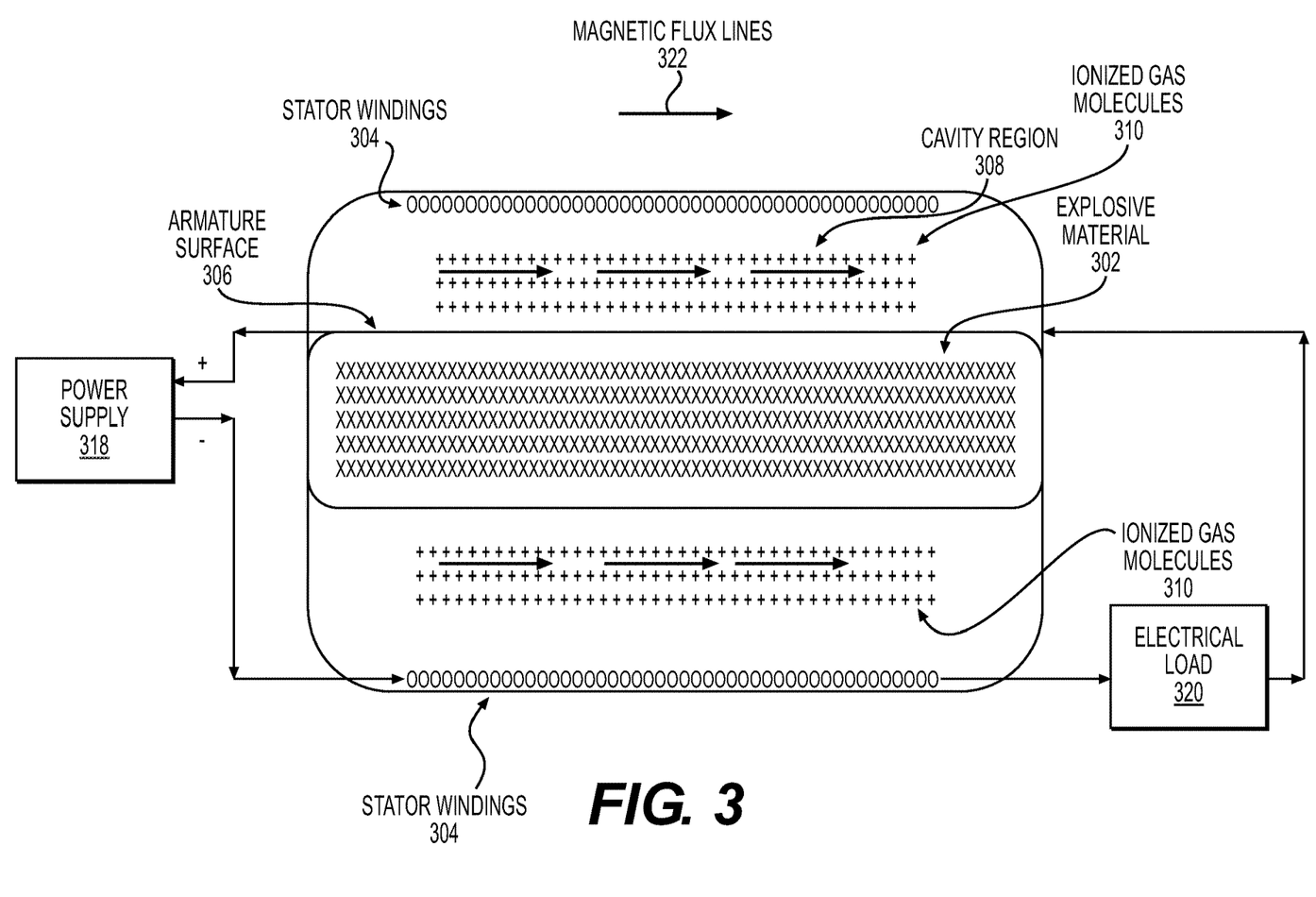
FIG. 3 shows a schematic representation of an alternative embodiment of the electromagnetic pulse generating device, wherein the device is configured as an explosively pumped modified flux compression generator.

A preferred embodiment of the present invention is depicted in FIG. 3, wherein devices of this general configuration have been coined in the technical literature as Flux Compression Generators (FCGs). One such prior art device can be found in U.S. Pat. No. 9,658,026 by inventors Fred Grace et al. The 026' patent teaches a particular configuration of a FCG device configured to explosively generate a linearly propagating highly compressed magnetic field, which in turn can generate enormous electrical currents, the net result of which claims to have the ability to launch an extremely high velocity projectile. However, the goal of the present invention is to generate an omnidirectional, radially expanding high intensity electromagnetic pulse as explained earlier.

FIG. 3 shows a cross sectional view of an explosively pumped Flux Compression Generator (FCG) 300 in accordance with the present invention. The main feature of the FCG includes a centrally located high velocity explosive material 302 which is encased in a conducting cylindrical housing which functions as an electrical armature surface 306. Candidate high velocity explosive material may include but are not limited to PETN (Pentaerythritoltetranitrate), TATP, (Triacetone triperoxide), RDX (Cyclotrimethylene trinitramine), and TNT amongst others. The entire device may be surrounded by an outer cylindrical surface of revolution 305 which may have electrically conducting stator windings 304 sequentially wound and adhered to its' inner surface. The outer surface 305 may form an air tight seal for the overall Flux Compression Generator (FCG) 300 with the appropriate air tight through-hole apertures to allow passage of electrical leads into and out of the outer surface 305. Also, the outer surface 305 may have an pneumatic adapter 307 to allow pressurizing the cavity region 308. In a preferred embodiment of the invention, the pneumatic adapter 307 may be utilized to inject ionized lithium gas molecules 310 into the cavity region 308.

The outer surface 305 may be segmented along its cylindrical length such that the proximal end of the said material may withstand intact the detonation of the explosive material and the distal end may be designed to disintegrate under pressure from the explosion.

In operation, an electrical power source 318 negative terminal may be connected to the proximal end of the conducting stator 304 and the positive terminal may be connected to the proximal end of the conducting armature 306 as depicted in FIG. 3. An electrical resistive load 320 may be connected between the distal ends of the conducting stator and armature, thereby establishing a closed loop circuit from the power supply through the stator to the load, back through the armature to the power supply. Prior to detonating the high velocity explosive material, the power supply 318 may be energized thereby establishing an initial nominal magnetic field 322 oriented in a longitudinal direction throughout the cavity region 308 filled with ionized gas molecules 310.

Figure 3A:
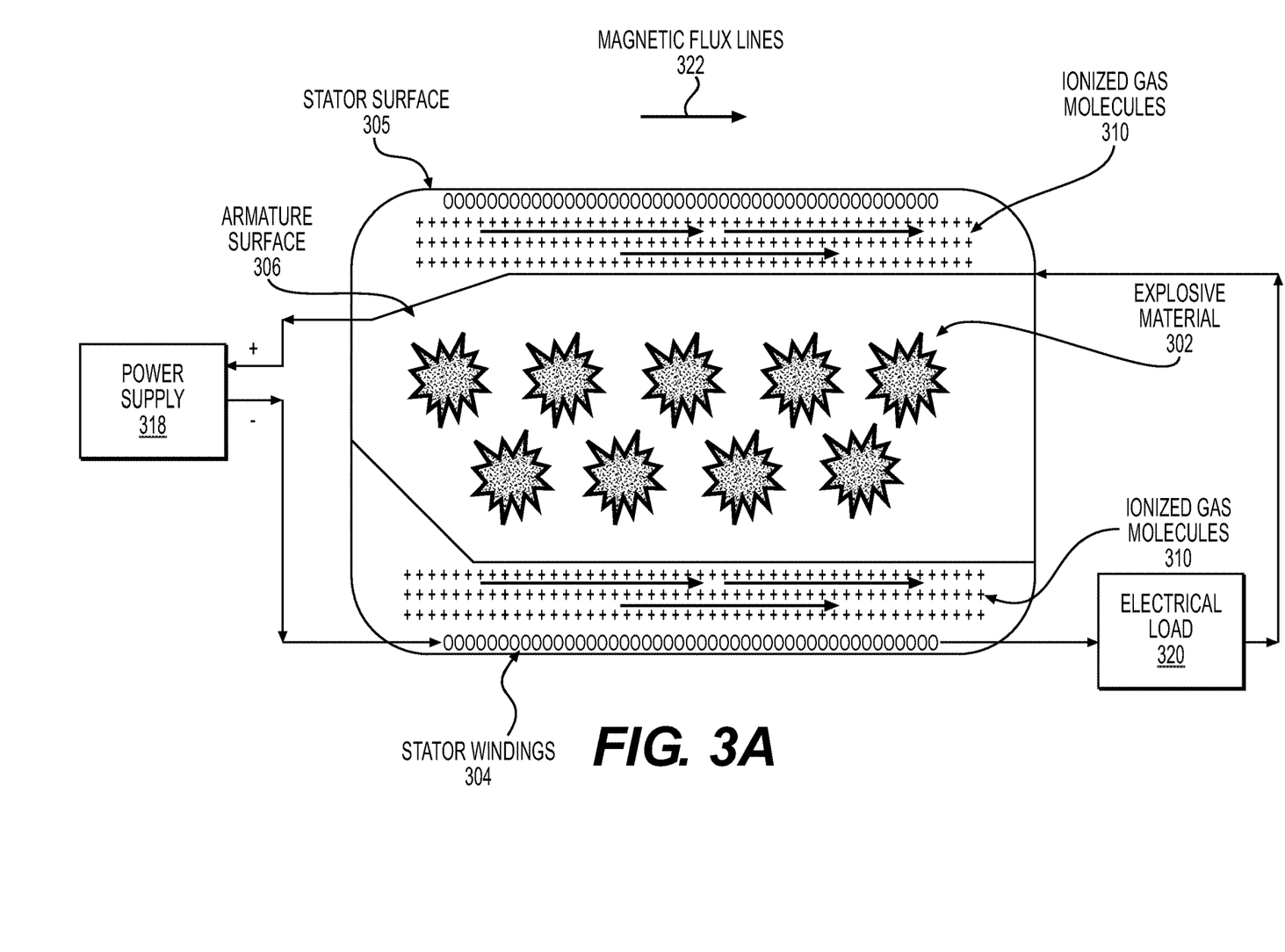
FIG. 3A depicts the electromagnetic pulse generating device immediately upon detonating the high velocity explosive material, wherein the explosive force begins deforming the armature surface outwardly toward the stator surface.
Figure 3B:
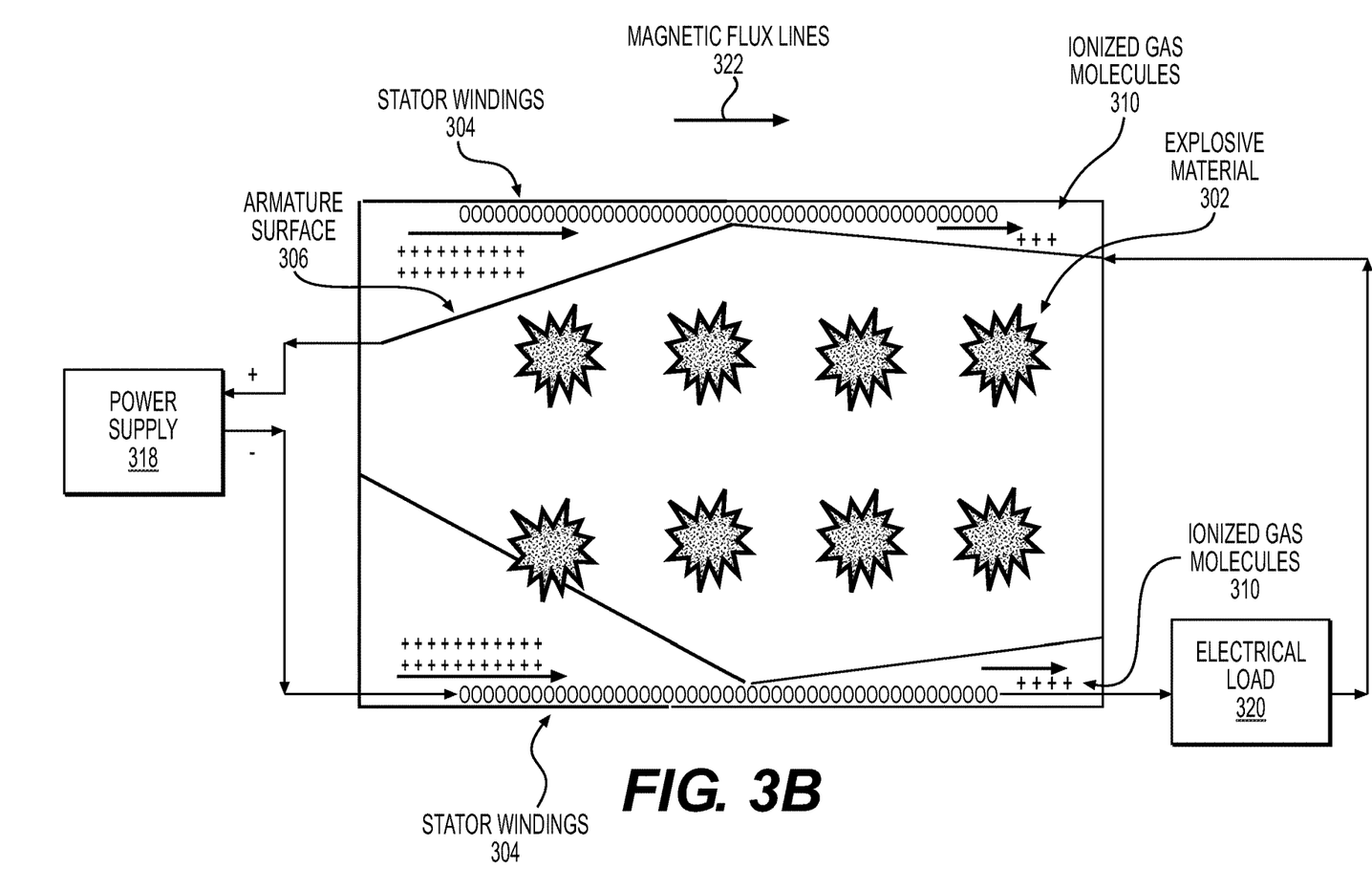
FIG. 3B depicts the electromagnetic pulse generating device approximately 10 microseconds after detonating the explosive material wherein the outwardly deforming armature surface first contacts the stator windings.

Immediately upon detonating the high velocity explosive material 302, the explosive force begins deforming the armature surface 306 outwardly toward the stator surface 305 as depicted in FIG. 3A, thereby greatly compressing/strengthening the magnetic field lines 322 and rapidly accelerating the ionized gas molecules 320 in the now reduced cavity region 308. Now, waiting approximately 10 milliseconds such that simultaneous with the outwardly deforming armature surface 306 contacting the stator windings 304 as depicted in FIG. 3B, short circuiting the load resistance 320 and maximizing the current available from the power supply 318 through the stator windings 304 thereby increasing the magnetic field strength 322 in the cavity region 308. The now high velocity charged particles 310 interact with the greatly increased magnetic field strength 322 by way of the Lorentz Force given by the vector cross product equation Lorentz Force=Velocity×Magnetic Field Strength, the net result being an additional rapid acceleration of the ionized particles—generating an enormous electro-magnetic pulse possibly in the terawatt regime.

Figure 3C:
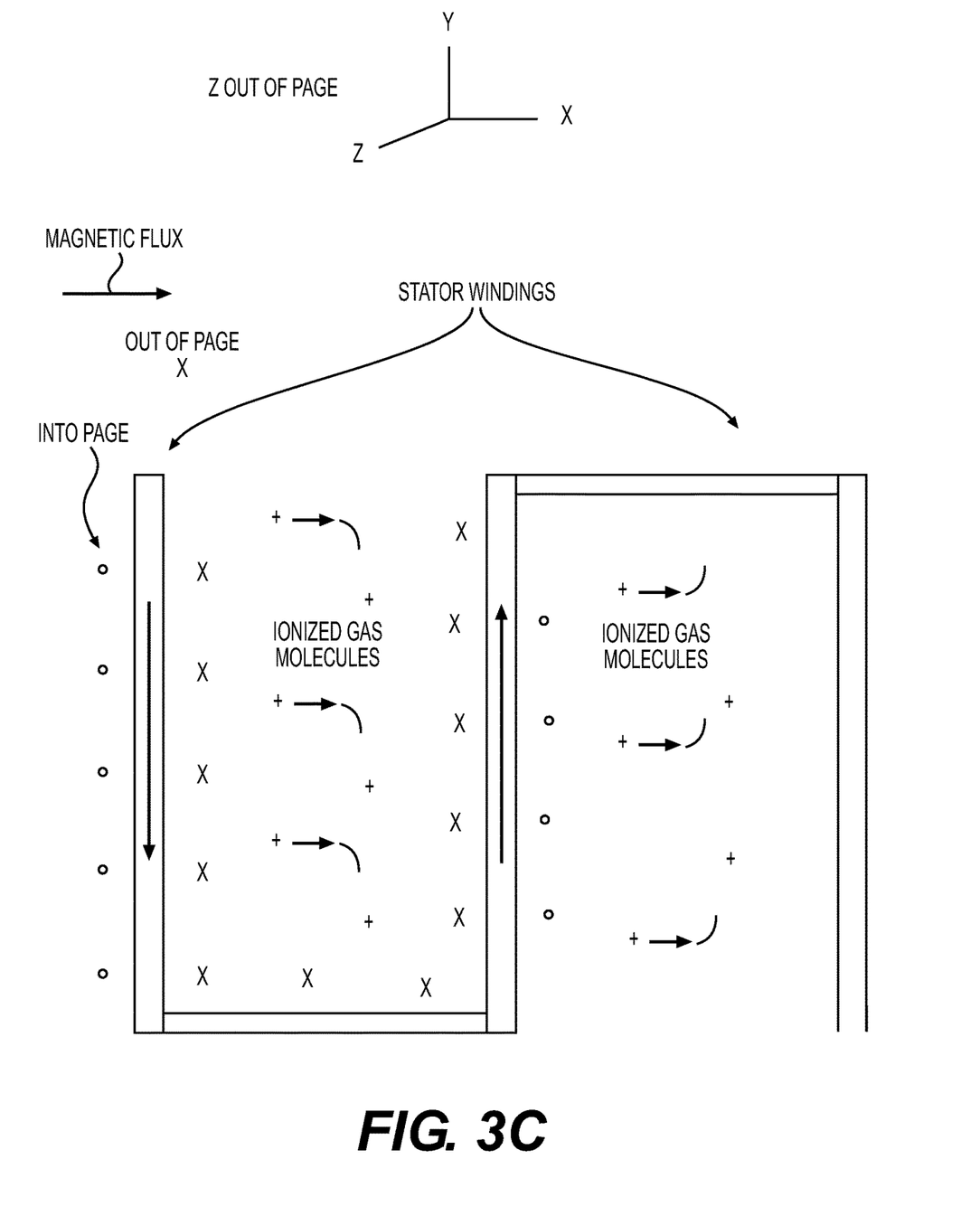
FIG. 3C depicts the electromagnetic pulse generating device when the explosive force has propagated longitudinally a predetermined distance toward the distal end of the device which disintegrates thereby releasing the accelerating ionized gas molecules.
Figure 3D:
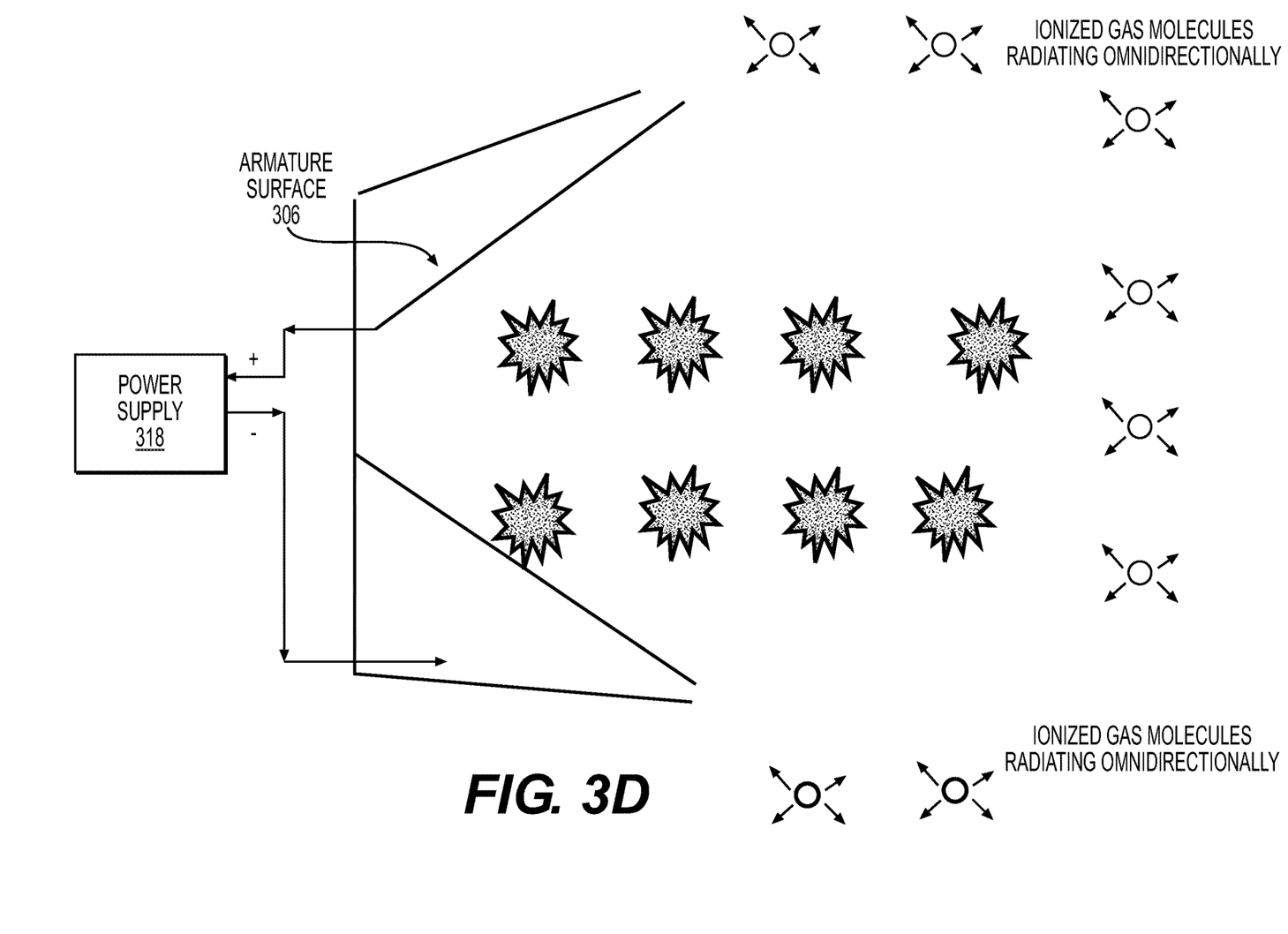
FIG. 3D shows ionized gas molecules releasing an omnidirectional electromagnetic burst from the compressed time varying magnetic field.
Figure 3E:
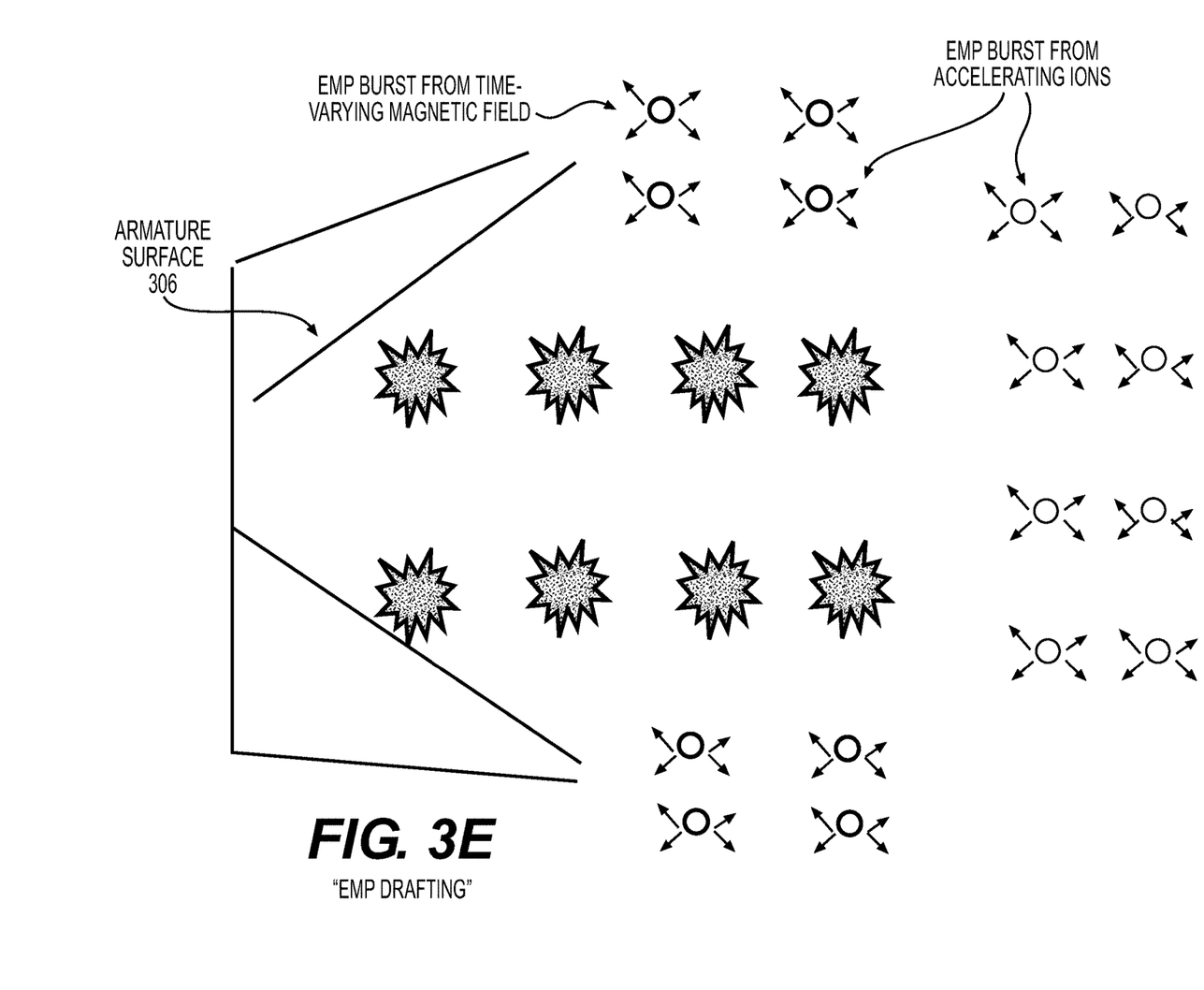
FIG. 3E shows an omnidirectional electromagnetic burst from the released rapidly accelerating ionized gas molecules.

Shortly thereafter (millisecond time frame), when the explosive force has propagated a predetermined distance toward the distal end of the outer coaxial cylindrical shell, designed to disintegrate under radial pressure, the outer shell material will disintegrate as depicted in FIG. 3C, thereby releasing an omnidirectional electromagnetic burst from the compressed time varying magnetic field 322 (FIG. 3D) and an omnidirectional electromagnetic burst from the released rapidly accelerating ionized gas molecules 310 (FIG. 3E).

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. An electro-magnetic device comprising;
   a central coaxial cylindrical shell acting electrically as a conducting armature filled with explosive material;
   an outer coaxial cylindrical shell closed on both the proximal and distal ends that encapsulates the said central coaxial cylindrical shell;
   a cavity between the central coaxial cylindrical shell and the said outer coaxial cylindrical shell filled with ionized gas molecules;
   an electrically conducting coil winding along and adhered to the inner surface of the outer coaxial cylindrical shell acting electrically as stator windings;
   a power supply negative terminal connected to the proximal end of the conducting stator winding and a positive terminal connected to the proximal end of the conducting armature;
   an electrical resistive load which establishes a current pathway from the distal output of the conducting stator windings to the distal end of the conducting armature thereby establishing a conduction pathway from the power supply through the stator to the load, back through the armature to the power supply closing the loop;
   a hardened material in mechanical communication with the proximal end of the said outer coaxial cylindrical shell capable of surviving intact the explosion of the said explosive material; and
   a means to detonate the explosive material.

2. The device of claim 1 wherein the said outer coaxial cylindrical shell may be segmented along its cylindrical outer surface wherein the proximal end of the said hardened material may withstand intact the detonation of the explosive material and the distal end may be designed to disintegrate under pressure from the explosion of the explosive material.

3. The device of claim 1 wherein prior to detonating the explosive material the said power supply is energized thereby establishing an initial magnetic field oriented in a longitudinal direction throughout the cavity region filled with ionized gas molecules.

4. The device of claim 3 wherein immediately after detonating the explosive material, the explosive force begins deforming the armature surface outwardly toward the stator surface thereby compressing the magnetic field lines and accelerating charged particles in the cavity region along the longitudinal direction toward the distal end of the cavity.

5. The device of claim 4 wherein waiting a time period of 10 milliseconds such that simultaneous with the outwardly deforming armature surface contacting the stator winding, short circuiting the load resistance and maximizing the current available from the power supply through the stator winding thereby increasing the magnetic field strength in the cavity region.

6. The device of claim 5 wherein the charged particles interact with the magnetic field by way of the Lorentz Force given by the vector cross product equation Lorentz Force=Velocity×Magnetic Field Strength, the net result being an additional rapid acceleration of the ionized particles thereby generating an electro-magnetic pulse.

7. The device of claim 6 wherein when the explosive force has propagated a predetermined distance toward the distal end of the outer coaxial cylindrical shell, the outer coaxial shell surface designed to disintegrate under pressure will disintegrate releasing an electromagnetic burst from a compressed time varying magnetic field and an electromagnetic burst from released accelerating ionized gas molecules.

* * * * *